Feb. 12, 1935.   W. R. BROWN   1,991,270
SPECTACLES
Filed Dec. 8, 1931   2 Sheets-Sheet 1
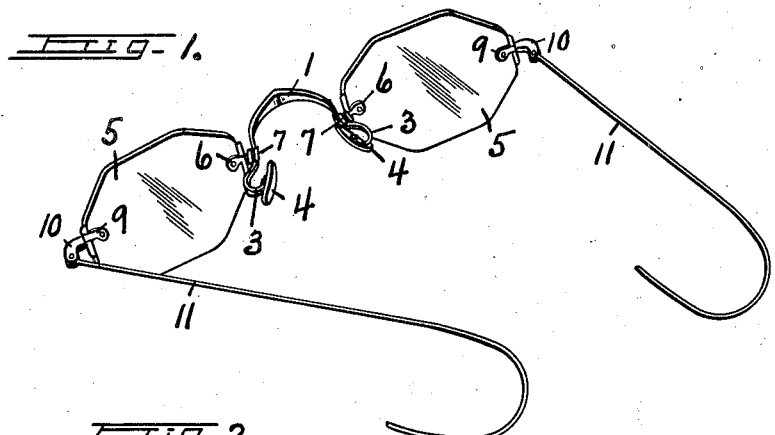
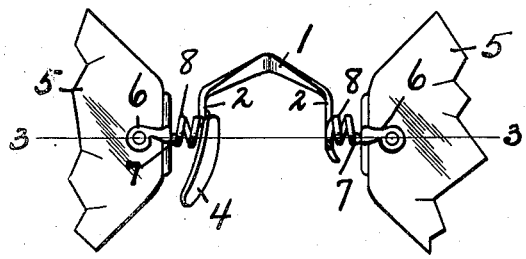
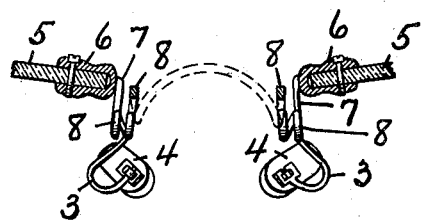
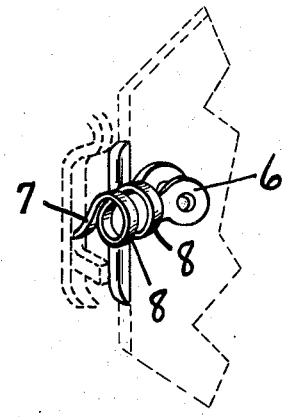
WITNESS
H. L. Meade
INVENTOR
W. R. Brown
BY
Denison Thompson
ATTORNEYS Feb. 12, 1935.  W. R. BROWN  1,991,270
SPECTACLES
Filed Dec. 8, 1931   2 Sheets-Sheet 2
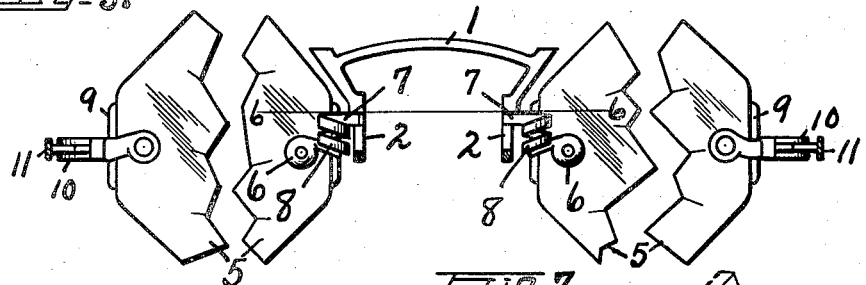
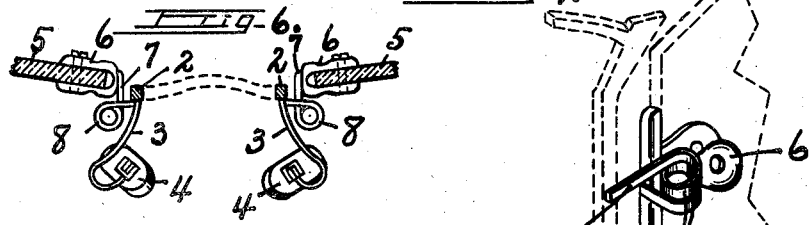
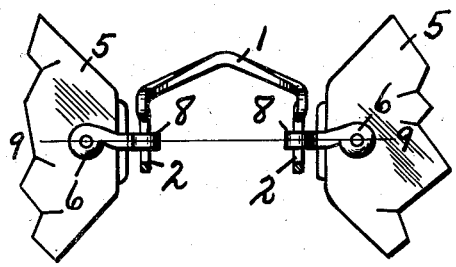
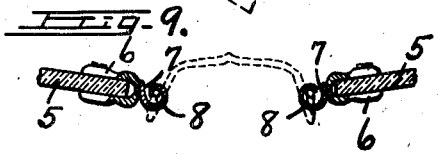
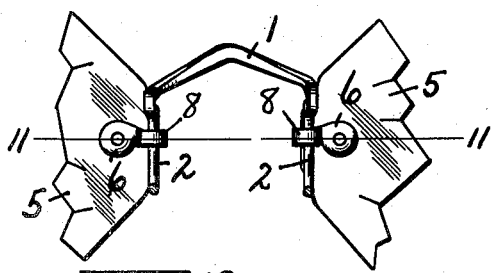
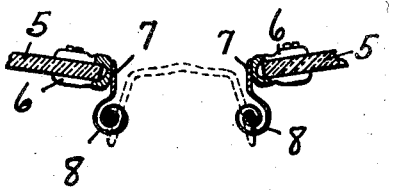
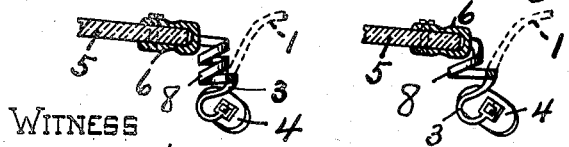
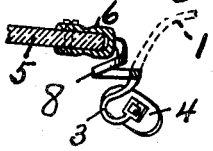
INVENTOR
W. R. Brown
By
Denison Simpson
ATTORNEYS
WITNESS
H. L. Meade Patented Feb. 12, 1935

1,991,270

UNITED STATES PATENT OFFICE 1,991,270

SPECTACLES

William Ralph Brown, Monroe, La., assignor to Shuron Optical Company, Inc., Geneva, N. Y., a corporation of New York Application December 8, 1931, Serial No. 579,717
In Great Britain September 25, 1931

9 Claims. (Cl. 88—42)

This invention relates to certain new and useful improvements in spectacles, and reference is hereby made to my copending application, Serial No. 487,620, filed October 9th, 1930 upon spectacles, now Patent No. 1,836,642, granted December 15, 1931.

The main object of the present invention is the production of a more efficient and permanent spectacle in which a rigid bridge is utilized in connection with nose pad supports rigidly secured thereto and adapted for permanent adjustment with respect to the bridge so that these portions of the spectacle will remain at all times in permanent adjustment to fit the nose of the wearer regardless of movement or deflection of other parts combined with resilient members in the form of a coil or coils connecting the rigid bridge and the lens supports or clamps so as to permit relative movement of the lens supports and lenses carried thereby on and with respect to the bridge, but without in any way disturbing or affecting the permanent adjustment of the bridge and the nose pad supports.

These resilient connecting members, due to their elasticity, act to normally maintain the lenses in predetermined alignment with the bridge, eliminating the necessity of frequent readjustment, but permitting, under actuation by the temples or otherwise, of temporary displacement from true alignment.

Another advantage incident to the construction above generally outlined in connection with the main object set forth, resides in the fact that the resilient connecting coil between the lens support and the rigid bridge with its permanently adjusted pad supports, constitutes a shock absorber and eliminates to a great extent, breaking of the lens at the point or points of its connection to the lens clamp or clamps.

Furthermore, the elastic connection described, prevents the temples, which are the means for securing the spectacles to the wearer, from exerting any appreciable force upon the bridge and permanently adjusted nose pad supports which would tend to bend the bridge or pad supports in a manner to affect their permanent adjustment.

Other objects and advantages relate to the details of construction, form and arrangement of the spectacle and the parts thereof, all as will more fully appear from the following description taken in connection with the accompanying drawings, in which:—

Figure 1 is a perspective view of the perhaps preferred form of the invention.

Figure 2 is a rear elevation of the structure illustrated in Figure 1 with the lenses partially broken away and with the resilient coils spread apart somewhat to more clearly illustrate the construction.

Figure 3 is a section taken on line 3—3, Figure 2.

Figure 4 is an enlarged perspective view of the resilient coil and lens clamp illustrating a portion of the bridge and lens in dotted lines.

Figure 5 is an elevation of a modified form of construction.

Figure 6 is a section taken on line 6—6, Figure 5.

Figure 7 is a view of the resilient coil and lens clamp shown in Figure 5, with a portion of the bridge and lens illustrated in dotted lines.

Figure 8 is an elevation of a further modified form of construction.

Figure 9 is a section on line 9—9, Figure 8.

Figure 10 is an elevation of a further modified form of construction.

Figure 11 is a section taken on line 11—11, Figure 10.

Figures 12 and 13 are sectional views similar to Figures 9 and 10 illustrating the connection of one lens only.

As stated, a perhaps preferred form of the invention is illustrated in Figures 1 to 4 inclusive. The spectacle there illustrated, comprises a rigid bridge 1 having, in this instance, opposed depending legs 2.

Nose pad supporting members 3 are rigidly secured to the respective legs 2 and may be formed of somewhat ductile metallic material lacking in resiliency, thereby adapting the nose pad supports for permanent adjustment with respect to the rigid bridge to position the pads 4 mounted on said pad supports 3 in place to fit the nose of the wearer. The nose pads 4 may be secured to the pad supports 3 in any suitable and well-known manner and may have, if desired, a slight rocking movement with respect to the nose pad supports.

The lenses 5 are positioned upon opposite sides of the bridge 1 and are provided in the form here shown, with lens clamps 6 at their inner edges adjacent the bridge 1. These clamps may be of the usual form and may be secured to the lenses in any well-known manner, as by small screws.

The clamps 6 and the lenses secured thereto, are connected to the rigid bridge by readily resilient or elastic connecting members 7. These members, as shown in Figures 1 to 4, are in the form of coiled springs which may consist of two convolutions more or less, one end of which coiled spring is rigidly connected to the bridge 1 as by soldering or the like, and the opposite end of which spring is connected to the lens clamp 6 as by soldering or the like.

In Figures 1 to 4, the coiled portions of the resilient connecting members 7 are disposed at the rear of the lens 5 and the bridge 1 so as not to be substantially visible from the front of the spectacle and permitting the positioning of the lenses in close relation with the legs 2 of the bridge 1. Further, as there illustrated, axes of the coils 8 of the resilient members 7, are substantially horizontally disposed and in alignment with the general plane of the lenses and substantially perpendicular to the axes of the lenses. These connecting members 7 may efficiently be formed of gold so tempered as to have practically no ductility, but a high degree of elasticity or resiliency.

The outer sides of lenses 5 are provided with lens clamps 9 having end-pieces 10 to which the temples 11 are pivotally connected in any usual manner.

With the construction described, the nose pad supports 3 are permanently adjusted on the rigid bridge 1 so as to fit the nose of the wearer without spring tension thereon, and the resilient connecting members 7 permit ready swinging and deflection of the lens clamp 6 as actuated by temples 11 or otherwise with respect to the rigid bridge and permanently adjusted nose pad supports without in any way disturbing or affecting the permanent adjustment of the parts which fit the nose of the wearer.

Figures 5, 6 and 7 illustrate a construction similar in all respects to that illustrated in Figures 1 to 3 except that the coils or convolutions 8 of connecting members 7 shown as two in number, have their axes disposed vertically at the rear of the lenses and the bridge instead of horizontally but permitting substantially the same swinging and flexing movement of the lenses with respect to the rigid bridge and permanently adjusted nose pad supports.

Figures 8 and 9 illustrate a further modified form of the invention in that the coil or coils 8 of the resilient connecting members 7 are wound one within the other about the opposite posts 2 of the bridge 1, one end of the resilient member 7 being connected to the bridge post and the other end connected to the lens clamp 6. With this arrangement, the foot of the bridge lies approximately in the plane of the lenses so that the lenses swing about a point in this plane.

In Figures 8 and 9, a single coil 8 is shown and although a single coil is effective in accomplishing the object of this invention, it may be desirable to use a plurality of coils, and in Figures 10 and 11 a construction similar to Figures 8 and 9 is shown, except two coils 8 are utilized in place of the single coil of Figure 8, and further, for the purpose of conserving space, the foot of the bridge and the coil are disposed at the rear of the plane of the lenses so as to permit close association of bridge and lenses.

Figure 11 illustrates a further modified form of structure in which a coil of two convolutions has one end connected to the lens clamp and its opposite end connected to the bridge with the coil disposed substantially horizontally and with its axis substantially perpendicular to the general plane of the lenses. Figure 12 illustrates a construction similar to that shown in Figure 11 except that a coil 8 of approximately a single convolution is utilized.

It will be noted that all of the constructions shown, have in common the feature of a resilient connecting member including a coil, and that the axis of this coil is in Figures 1 to 10, in a plane substantially perpendicular to the axis of the lenses and substantially parallel to the normal plane of the lenses, whereas in Figures 11 and 12 a different disposition of the coil is illustrated. These various embodiments of applicant's invention including the resilient connecting members with their coil or coils, permit close assemblage of the lenses with respect to the bridge, and this feature is important in present day constructions in which comparatively large lenses are desirable for the reason that if the nose portion of the mounting is wider, that is, if the distance between the inner edges of the lenses is wider, the lenses must be smaller to bring their centers opposite the pupils of the eyes. It is, therefore, quite essential that if large lenses are to be used, a close association of the bridge and lenses is essential.

Although I have illustrated and described various embodiments of my invention as constituting perhaps preferred forms and modifications thereof, I do not desire to restrict myself to the details of the structures illustrated, as various and other modifications may be made without departing from the spirit of the invention as set forth in the appended claims.

I claim:

1. A spectacle comprising a rigid bridge, a nose pad support rigidly secured thereto for permanent adjustment with respect to the bridge, a pad carried by said supporting member, a lens-carrying member and a resilient element connected to the bridge and to the lens-carrying member and having an intermediate coiled portion with its axis substantially parallel with the general plane of the lenses permitting swinging movement of the lens-carrying member independently of the bridge and pad support.

2. A spectacle comprising a rigid bridge, a nose pad, a nose pad supporting member rigidly secured to the bridge for permanent adjustment with respect thereto to fit the nose of the wearer without spring tension, a lens-carrying member and a resilient element connected to the bridge and to the lens-carrying member and including an intermediate coiled portion with its axis substantially parallel with the general plane of the lenses permitting movement of the lens-carrying member independently of the bridge and pad support without affecting the permanent adjustment of said bridge and pad support.

3. A spectacle comprising a rigid bridge, a nose pad supporting member rigidly secured thereto for permanent adjustment with respect to the bridge, a pad carried by said suppporting member, a lens-carrying member and a resilient element connected to the bridge and to the lens-carrying member and including an intermediate coiled portion with its axis substantially parallel with the general plane of the lenses and constituting the sole support for the lens-carrying member from the bridge and permitting swinging movement of the lens-carrying member independently of the bridge and pad support.

4. A spectacle comprising a rigid bridge, a nose pad supporting member rigidly secured thereto for permanent adjustment with respect to the bridge, a pad carried by said supporting member, a lens-carrying member and a resilient element connected to the bridge and to the lens-carrying member and including an intermediate coiled portion comprising a plurality of convolutions and constituting the sole support for the lens-carrying member from the bridge and permitting swinging movement of the lens-carrying member independently of the bridge and pad support.

5. A spectacle comprising a rigid bridge, a nose pad support rigidly secured thereto for permanent adjustment with respect to the bridge, a pad carried by said supporting member, a lens-carrying member and a resilient element connected to the bridge and to the lens-carrying member and having an intermediate coiled portion comprising a plurality of convolutions and disposed in a plane at the rear of the bridge permitting swinging movement of the lens-carrying member independently of the bridge and pad support.

6. A spectacle comprising a rigid bridge, a nose pad, a nose pad supporting member rigidly secured to the bridge for permanent adjustment with respect thereto to fit the nose of the wearer without spring tension, a lens-carrying member and a resilient element connected to the bridge and to the lens-carrying member and including an intermediate coiled portion comprising a plurality of convolutions disposed in a plane at the rear of the bridge permitting movement of the lens-carrying member independently of the bridge and pad support without affecting the permanent adjustment of said bridge and pad support.

7. A spectacle comprising a rigid bridge, a nose pad supporting member rigidly secured thereto for permanent adjustment with respect to the bridge, a pad carried by said supporting member, a lens-carrying member and a resilient element connected to the bridge and to the lens-carrying member and including an intermediate coiled portion comprising a plurality of convolutions disposed in a plane at the rear of the bridge and constituting the sole support for the lens-carrying member from the bridge and permitting swinging movement of the lens-carrying member independently of the bridge and pad support.

8. A spectacle comprising a rigid bridge adapted to be permanently adjusted to fit the nose of the wearer, a lens-carrying member and a separate resilient element connected to the bridge and to the lens-carrying member and including an intermediate coiled portion with its axis substantially parallel with the general plane of the lenses and constituting the sole support for the lens-carrying member from the bridge and permitting swinging movement of the lens-carrying member independently of the bridge.

9. A spectacle comprising a rigid bridge adapted to be permanently adjusted, a nose pad supporting member rigidly secured to the bridge, a pad carried by said supporting member, a lens carrying member and a separate resilient element connected to the bridge and to the lens carrying member and including an intermediate coiled portion with its axis substantially parallel with the general plane of the lenses and constituting the sole support for the lens-carrying member of the bridge and permitting swinging movement of the lens-carrying member independently of the bridge.

WILLIAM RALPH BROWN.